United States Patent [19]
Vo et al.

[11] Patent Number: 5,389,694
[45] Date of Patent: Feb. 14, 1995

[54] FOAMABLE STYRENIC POLYMER GEL HAVING A CARBON DIOXIDE BLOWING AGENT AND A PROCESS FOR MAKING A FOAM STRUCTURE THEREFROM

[75] Inventors: Chau V. Vo, Souffelweyersheim, France; Andrew N. Paquet, Granville, Ohio

[73] Assignee: The Dow Chemical Company, Midland, Mich.

[21] Appl. No.: 71,839

[22] Filed: Jun. 4, 1993

[51] Int. Cl.[6] .............................. C08J 9/08; C08J 9/12
[52] U.S. Cl. .................................... 521/79; 521/97; 521/98; 521/147; 521/910
[58] Field of Search ................. 521/79, 147, 98, 97

[56] References Cited

U.S. PATENT DOCUMENTS

| | | | |
|---|---|---|---|
| 4,312,910 | 1/1982 | Suh et al. | 428/220 |
| 4,454,086 | 6/1984 | Corbett et al. | 264/53 |
| 4,455,272 | 6/1984 | Schubert et al. | 264/53 |
| 4,528,221 | 7/1985 | Komatsuzaki et al. | 428/35 |
| 4,532,265 | 7/1985 | Park et al. | 521/147 |
| 4,535,094 | 8/1985 | Park et al. | 521/79 |
| 5,049,328 | 9/1991 | Meyer et al. | 264/50 |

FOREIGN PATENT DOCUMENTS

| | | |
|---|---|---|
| 0081005 | 6/1983 | European Pat. Off. . |
| 0485226A1 | 5/1992 | European Pat. Off. . |
| 4236247 | 8/1992 | Japan . |

*Primary Examiner*—Morton Foelak
*Attorney, Agent, or Firm*—J. Robert Dean, Jr.

[57] ABSTRACT

Disclosed is a foamable styrenic polymer gel capable of forming a closed-cell foam structure, comprising: a) a flowable melt of a styrenic polymer material comprising greater than 50 percent by weight styrenic monomeric units and about 0.1 to about 40 percent by weight of oxygen-containing monomeric units based upon the total weight of the styrenic polymer material; and b) a blowing agent comprising about 5 weight percent or more carbon dioxide based upon the total weight of the blowing agent. Further disclosed is a process for making the foam structure. The oxygen-containing comonomer content in the styrenic polymer material enables process operating pressures to be significantly reduced when using carbon dioxide as a blowing agent compared to a styrenic polymer material without comonomer content. The foam structure formed is of low density and of good quality.

19 Claims, No Drawings

FOAMABLE STYRENIC POLYMER GEL HAVING A CARBON DIOXIDE BLOWING AGENT AND A PROCESS FOR MAKING A FOAM STRUCTURE THEREFROM

The invention relates to a foamable styrenic polymer gel expandable to form a closed-cell foam structure with carbon dioxide blowing agent and a process for making the structure.

BACKGROUND OF THE INVENTION

Due to present environmental concerns over the use of potentially ozone-depleting or flammable blowing agents, it is desirable to make styrenic polymer foam structures with a blowing agent containing carbon dioxide. Such foam structures blown with carbon dioxide can be seen in U.S. Pat. Nos. 4,455,272, 4,559,367, and European Patent Application 89114160.8.

A problem with using carbon dioxide as a blowing agent for styrenic polymer foam structures is its relatively low solubility in melts of the styrenic polymer. The low solubility results in high system pressure, which manifests itself in high pressure drop and excessive die pressure. Lowering pressure drop and die pressure would save energy costs, improve skin quality, and reduce the pressure duty requirements for process equipment. Low carbon dioxide solubility also results in small cell size and high density. Increasing carbon dioxide solubility would increase cell size and lower density, which in turn permits larger potential foam cross-section.

SUMMARY OF THE INVENTION

According to the present invention, there is a foamable styrenic polymer gel capable of forming a closed-cell foam structure, comprising: a) a flowable melt of a styrenic polymer material comprising greater than 50 percent by weight styrenic monomeric units and about 0.1 to about 40 percent by weight of oxygen-containing monomeric units based upon the total weight of the styrenic polymer material; and b) a blowing agent comprising about 5 weight percent or more carbon dioxide based upon the total weight of the blowing agent. The presence of the oxygen-containing comonomer in the melt of the styrenic polymer material enables process operating pressures to be significantly reduced when using carbon dioxide as a blowing agent compared to a corresponding melt of the styrenic polymer material without the oxygen-containing comonomer.

Further, according to the present invention, there is a process for making a styrenic polymer foam structure, comprising: a) heating a styrenic polymer material; b) incorporating into the melt polymer material at an elevated pressure a blowing agent to form a foamable gel; and c) expanding the foamable gel at a reduced pressure to form a foam structure. Preferably, the foamable gel is cooled to an optimum foaming temperature, and then expanded by extruding it through the die to form the foam structure. The blowing agent comprises about 5 weight percent or more of carbon dioxide based upon the total weight of the blowing agent. The styrenic polymer material comprises greater than 50 percent by weight styrenic monomeric units and about 0.1 to about 40 percent by weight of oxygen-containing monomeric units based upon the total weight of the styrenic polymer material.

DETAILED DESCRIPTION

The present foam structure comprises a styrenic polymer material. Suitable styrenic polymer materials include styrenic homopolymers and copolymers of styrenic compounds and copolymerizable ethylenically unsaturated comonomers. The styrenic polymer material may further include minor proportions of non-styrenic polymers. The styrenic polymer material may be comprised solely of one or more styrenic copolymers, a blend of one or more of each of styrenic homopolymers (such as polystyrene) and copolymers, or blends of any of the foregoing with a non-styrenic polymer. Regardless of composition, the styrenic polymer material comprises greater than 50 and preferably greater than 70 weight percent of styrenic monomeric units. Most preferably, the styrenic polymer material comprises a blend of a styrenic copolymer and a styrenic homopolymer. The styrenic polymer material preferably has a weight average molecular weight of 100,000–350,000 according to size exclusion chromatography.

Suitable styrenic monomers polymerizable to form styrenic polymers useful in the styrenic polymer material include those derived from alkenyl aromatic compounds such as styrene, alphamethylstyrene, alphaethylstyrene, ethylstyrene, vinyl benzene, vinyl toluene, chlorostyrene, and bromostyrene.

In the present invention, it is desirable to select a styrenic polymer material having in melt form a relatively high carbon dioxide solubility. Increasing carbon dioxide solubility allows process pressures employed in making a foam structure to be reduced. Extruder pressure, mixer pressure, die pressure and pressure drop between an extruder or mixer and the die could be reduced.

The styrenic polymer material contains about 0.1 to about 40 weight percent, preferably about 0.3 to about 30 weight percent, and more preferably about 2 to about 20 weight percent of oxygen-containing monomer (OCM) monomeric units based upon the total weight of the styrenic polymer material. The OCM will be a compound other than the styrenic comonomer or compound, and will be copolymerized therewith. The OCM monomeric unit content of the styrenic polymer material increases the solubility of carbon dioxide in the styrenic polymer material relative to a corresponding styrenic polymer material without the OCM monomeric unit content.

Suitable OCM include compounds of the formula:

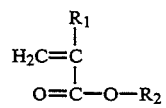

where $R_1$ and $R_2$ are H (hydrogen) or $C_{1-8}$ alkyl groups. Suitable OCM include $C_{1-8}$ alkyl acids, esters, and anhydrides, such as acrylic acid, methacrylic acid, ethacrylic acid, methyl methacrylate, ethyl methacrylate, butyl methacrylate, maleic acid, itaconic acid, maleic anhydride, methyl acrylate, ethyl acrylate, butyl acrylate, propyl acrylate, methyl methacrylate, and vinyl acetate. Other suitable OCM include $C_{1-8}$ aliphatic alcohols such as methanol, ethanol, n-propanol, isopropanol, n-butanol, isobutanol, n-pentanol, isopentanol, neopentanol, n-hexanol, h-heptanol, and n-octanol. Preferred styrenic polymer materials are those having OCM content such as those containing styrene/acrylic acid copolymer, styrene/butyl acrylate copolymer, styrene/butyl methacrylate, and mixtures of polystyrene with any or all of the foregoing.

Minor amounts of other copolymerizable monoethylenically unsaturated compounds other than OCM such as ionomeric derivatives, $C_{2-6}$ dienes, and $C_{2-8}$ olefins may be employed. Examples of suitable copolymerizable compounds include acrylonitrile, vinyl alcohol, amides, butadienes, maleimides, vinylsiloxanes, pentadiene, hexadiene, ethylene, propylene, hexene, and octene.

The foam structure is generally formed by melting and mixing the styrenic polymer material to form a polymer material melt, incorporating a blowing agent into the polymer material melt to form a foamable gel, and extruding the foamable gel through a die to form the foamed structure. During melting and mixing, the polymers are heated to a temperature at or above the glass transition temperature of the polymer material. Melting and mixing of polymer material and any additives is accomplished by any means known in the art such as with an extruder, mixer, or blender. Likewise, the blowing agent is incorporated or blended into the polymer material melt by any of the same above-described means. The blowing agent is blended with the polymer material melt at an elevated pressure sufficient to prevent substantial expansion of the resulting plastic gel or loss of generally homogeneous dispersion of the blowing agent within the foamable gel. The blowing agent is incorporated into the melt in a weight proportion of between about 1 to about 30 parts and preferably from about 2 to about 18 parts per hundred parts of the polymer to be expanded. The blowing agent is preferably incorporated into the melt in a liquid, gas, or vapor form. The foam gel is preferably passed through a cooler or cooling zone to lower the gel temperature to an optimum foaming temperature. For styrenic polymers, typical optimum foaming temperatures range from 110° C. to 135° C. The cooled gel is then passed through the die into a zone of lower or reduced pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

The blowing agent employed in the present invention preferably comprises 5 weight percent or more, preferably 10 weight percent or more, and more preferably 20 weight percent or more carbon dioxide based upon the total weight of the blowing agent. The blowing agent may be composed entirely of carbon dioxide as well. It is advantageous to employ as much carbon dioxide as possible in the blowing agent while still making a desirable foam structure because carbon dioxide is economical and does not harm the environment.

Secondary blowing agents which may be utilized in combination with carbon dioxide include inorganic agents, organic blowing agents and chemical blowing agents. Suitable inorganic blowing agents include nitrogen, argon, water, air, and helium. Organic blowing agents include aliphatic hydrocarbons having 1-9 carbon atoms, fully and partially halogenated aliphatic hydrocarbons having 1-4 carbon atoms, and $C_{1-6}$ aliphatic alcohols. Aliphatic hydrocarbons include methane, ethane, propane, n-butane, isobutane, n-pentane, isopentane, neopentane, and the like. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane, 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. $C_{1-6}$ aliphatic alcohols include ethanol, n-propanol, isopropanol, n-butanol, isobutanol, n-pentane, isopentane, neopentane, n-hexanol, and isohexanol. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

Preferred secondary blowing agents are isopentane, ethanol, and mixtures of the same.

Though the preferred process for making the present structure is an extrusion process, it is understood that the above structure may be formed by expansion of beads, which may be molded at the time of expansion to form structures of various shapes. Insulating panels formed from molded, expandable beads are commonly referred to as bead board.

The present foam structure may be unimodal or bimodal in cell size distribution. A unimodal cell size distribution is one in which the cells are of a generally uniform size throughout the foam structures, except for the skin regions in the case of extruded foam. A bimodal cell size distribution is one in which there is one group of relatively larger primary foam cells of generally uniform size and another group of relatively smaller secondary foam cells of generally uniform size ranging in average cell size from about 5 percent to about 50 percent of the average cell size of the primary cells. The secondary cells may be situated within the cell walls or struts of the primary cells, or may be situated outside of or adjacent to the primary cells individually or in groups of two or more. A strut is a juncture of three or more cell walls. The primary cells may be generally dispersed throughout the secondary cells such that the foam structure has a generally heterogeneous dispersion of the two cell types throughout. Bimodal structures may be formed by employing a blowing agent having about 1 percent or more water based upon the total weight of the blowing agent. Unimodal structures may be formed when employing a blowing agent having water provided the water content in the blowing agent is sufficiently small. The blowing agent employed in making the present foam structure may contain water or may be free of water. Additional teachings directed to foam structures with bimodal cell distributions and processes for making are seen in U.S. Pat. Nos. 4,455,272 and 4,559,367, U.S. Ser. Nos. 07/895,970 filed Jun. 9, 1992 and 07/896,025 filed Jun. 9, 1992, and European Patent Application No. 89114160.8, which are incorporated herein by reference.

The foam structure may contain additional additives such as pigments, fillers, antioxidants, nucleating agents, extrusion aids, nucleating agents, stabilizing agents, antistatic agents, fire retardants, acid scavengers, or the like.

The foam structure is closed-cell, and has a closed-cell content of at least 90 percent according to ASTM D-2856-87.

The present foam structure is substantially non-crosslinked or substantially free of crosslinking. It is permissible however, for the present structure to have a slight degree of crosslinking which may occur naturally without the use of crosslinking agents or radiation.

The foam structure preferably has density of about 16 to about 80 kilograms per cubic meter according to ASTM D-1622. The foam component further preferably has an average cell size of about 0.05 to about 2.4 millimeters according to ASTM D3576-77.

The foam structure may be used to insulate various surfaces by applying to the surface an insulating panel fashioned from the present structure. Such panels may be used in any conventional insulating application such as roofing, buildings, refrigerators, etc.

The foam structure may also be formed into a plurality of discrete foamed particles for conventional loose-fill cushioning and packaging applications.

The following are examples of the present inventions and are not to be construed as limiting. Unless otherwise indicated, all percentages, parts, or proportions are by weight. Unless otherwise indicated, the term "pph" means parts per hundred by weight based upon the weight of a polymer or mixture of polymers.

EXAMPLES

Closed-cell styrenic polymer foam structures were made according to the process of the present invention in the following examples.

Certain physical properties were measured as follows: density according to ASTM D-1622; cell size according to ASTM D3576-77; open cell content according to ASTM D2856-87; environmental dimensional change (E.D.C.) according to ASTM C-578-83; and water vapor permeability (WVP) according to BS-4370 (Method 8).

EXAMPLE 1

A closed-cell styrenic polymer foam structure was prepared with a styrene-butyl acrylate copolymer (SBA) with a blowing agent of carbon dioxide and water. A control foam structure without the copolymer was also prepared.

The apparatus employed comprised a 1¼ inch (3.2 centimeter (cm)) diameter extruder, a mixer, a cooler, and a die in series. Carbon dioxide and water were injected into the mixer in amounts shown in Table 1. The temperature of the cooling zone was adjusted to obtain optimum uniform foaming temperatures.

In Run 1, a control foam structure was made with a polystyrene resin having a weight average molecular weight of 200,000 according to size exclusion chromatography (SEC). Butyl acrylate content in the copolymer was 6 percent. Process conditions and physical property values are shown in Table 1.

Surprisingly, the foam structure of the present invention had lower density and larger cell size than the control foam structure. The cross-section was also larger.

EXAMPLE 2

A closed-cell styrene polymer foam structure was prepared according to the process of the present invention with a blend of polystyrene and a styrenebutyl acrylate copolymer and a blowing agent of carbon dioxide. A control foam structure without copolymer was also prepared.

The apparatus of Example 1 was employed. A blend of 75 weight percent of polystyrene having a weight average molecular weight of 172,000 according to SEC and of 25 weight percent styrene-butyl acrylate copolymer of 200,000 weight average molecular weight according to SEC was employed. The copolymer contained 88 weight percent styrene monomeric units and 12 weight percent butylacrylate monomeric units. Varying amounts of carbon dioxide were injected into the mixer in varying amounts as shown in Table 2. Process temperatures were adjusted to obtain optimum uniform foaming temperatures. Process conditions and physical property values are contained in Table 2.

The foam structure of the present invention (Run 4) exhibited lower pressure drop, lower density, and better skin quality than the control foam structure of Run 3.

EXAMPLE 3

Closed-cell styrene polymer foam structures were prepared according to the process of the present invention with blends of polystyrene, styrene-butyl acrylate copolymer, and/or polyalphamethylstyrene. Control foam structures were prepared without the copolymer. Carbon dioxide was employed as the blowing agent.

The apparatus used was as in Example 1. Carbon dioxide was fed to the mixer at varying levels as shown in Table 3.

Control foam structures comprised polystyrene and a 80/20 blend by weight of the polystyrene and low molecular weight polyalphamethylstyrene of weight average molecular weight of 11,900 according to SEC and a glass transition temperature of 142° C. according to differential scanning calorimetry. The latter was used to reduce the gel line pressure.

Pressure drop was significantly reduced with the use of SBA copolymer in combination with PAMS than without them. Further, higher levels of carbon dioxide could be used, which resulted in lower densities.

EXAMPLE 4

A closed-cell styrene polymer foam structure was prepared with a styrene-acrylic acid copolymer (SAA) with a blowing agent of carbon dioxide and water. A control foam structure was made substituting polystyrene for SAA.

The apparatus and formulation was as in Example 1, except that the copolymer was a styrene-acrylic acid copolymer, and had an acrylic acid content of about 3 percent based upon the weight of the copolymer. The temperature of the cooling zone was adjusted to obtain an optimum uniform foaming temperature of 132° C.–137° C. Process conditions and physical property values are represented in Table 4.

Pressure drop was significantly reduced with the use of SAA than without it. Further, a foam structure of larger cross-section was made with SAA than without it.

EXAMPLE 5

Closed-cell styrenic polymer foam structures were prepared according to the process of the present invention with SBA copolymer and blends of same with polystyrene. A control foam structure of polystyrene was also prepared.

The apparatus comprised a 2 inch (5.1 cm) extruder, a mixer, coolers, and a die in series. The blowing agent was carbon dioxide in varying amounts. The butyl acrylate content of the SBA copolymer was 4 weight percent and 13 weight percent based upon the total weight of the respective SBA copolymers. The polystyrene was general purpose polystyrene of 200,000 weight average molecular weight according to SEC.

Foam structures of the present invention (Runs 12–16) made with SBA copolymer could be made with higher levels of carbon dioxide than with the control structure (Run 11) comprising polystyrene and still achieve good skin quality and large cell size. This is unusual because high carbon dioxide levels usually result in poor skin quality and small cell size. Furthermore, the foams exhibited lower density than and equivalent mechanical properties as the control structure. Thermal properties of the foam Structures were good, and they were resistant to water vapor as well.

EXAMPLE 6

Closed-cell styrenic polymer foam structures were prepared according to the process of the present invention with an SBA copolymer. A control structure was prepared with polystyrene. The blowing agent was carbon dioxide and ethanol (EtOH).

The foam structures were made according to Example 3. The SBA copolymer (butyl acrylate content of about 4 weight percent) based upon the total weight of the SBA copolymer was used in this experiment.

The foam structures of the present invention (Runs 18–20) could be made with significantly lower mixer pressure, die pressures, and pressure drop than the control foam structure (Run 17). The present foam structures had lower density than the control structure, excellent skin quality and excellent physical properties.

EXAMPLE 7

Styrenic polymer foam structures were prepared according to the present invention with a styrenebutylacrylate copolymer (SBA). Control foam structures with polystyrene were also prepared.

The apparatus comprised an 8 inch extruder, a mixer, coolers, and a die in series. The copolymer contained 3 weight percent butyl acrylate based upon the total weight of the copolymer, and had a weight average molecular weight of 160,000 according to SEC. The blowing agent comprised a mixture of carbon dioxide and iso-pentane, or a mixture of carbon dioxide and ethanol.

Foam structures of the present invention (Runs 21–23) having SBA copolymer could be made with higher levels of carbon dioxide than the control structures (Runs 24–26). Furthermore, the present foam structures exhibited lower density and generally equivalent mechanical properties compared to the control structures.

TABLE 1

| | | | Foam Structure of Example 1 | | | | | | | | |
|---|---|---|---|---|---|---|---|---|---|---|---|
| Run No. | Styrene Content (percent) | Butyl-Acrylate Content (percent) | Blowing Agent (pph)[1] $CO_2$ | Blowing Agent (pph)[1] $H_2O$ | Foaming Temp. (C°) | Pressure (bar) Mixer In | Pressure (bar) Die | Pressure Drop (bar) | Density (kgm) | Cell Size (mm) | Cross-Section (cm²) | Skin[2] |
| 1* | 100 | 0 | 4.0 | 0.3 | 134 | 207 | 121 | 86 | 38.2 | 0.21 | 2.34 | G |
| 2 | 94 | 6 | 4.0 | 0.3 | 131 | 169 | 100 | 69 | 34.1 | 0.46 | 3.17 | G |

*Control
[1] pph = parts per hundred blowing agent per hundred parts polymer by weight
[2] Skin quality (G = good; A = average; P = poor)

TABLE 2

| | | | Foam Structure of Example 2 | | | | | | | | |
|---|---|---|---|---|---|---|---|---|---|---|---|
| Run No. | Polystyrene[1] (percent) | SBA[2] (percent) | Blowing Agent (pph)[3] $CO_2$ | Blowing Agent (pph)[3] $H_2O$ | Foaming Temp. (C°) | Pressure (bar) Mixer In | Pressure (bar) Die | Pressure Drop (bar) | Density (kgm) | Cell Size (mm) | Cross-Section (cm²) | Skin[4] |
| 3* | 100 | 0 | 4.5 | 0 | 131 | 179 | 121 | 59 | 37.0 | 0.21 | 2.38 | A |
| 4 | 75 | 25 | 4.9 | 0 | 133 | 159 | 107 | 52 | 35.2 | 0.16 | 1.71 | G |

*Control
[1] Polystyrene of weight molecular weight of 172,000 according to SEC
[2] Styrene-Butylacrylate copolymer (12 percent butyl acrylate by weight based on weight of the copolymer)
[3] pph = parts blowing agent per hundred parts of polymer by weight
[4] Skin quality (G = good; A = average; P = poor)

TABLE 3

| | | | | Foam Structures of Example 3 | | | | | | | |
|---|---|---|---|---|---|---|---|---|---|---|---|
| Run No. | Polystyrene[1] (percent) | SBA[2] (percent) | PAMS[3] (percent) | Blowing Agent $CO_2$ (pph)[4] | Foaming Temp. (C°) | Pressure (bar) Mixer In | Pressure (bar) Die | Pressure Drop (bar) | Density (kgm) | Cell Size (mm) | Cross-Section (cm²) | Skin[5] |
| 5* | 100 | 0 | 0 | 4.5 | 132 | 227 | 128 | 99 | 39.6 | 0.21 | 2.72 | G |
| 6 | 80 | 0 | 20 | 4.0 | 134 | 189 | 119 | 70 | 40.4 | 0.26 | 2.37 | G |
| 7 | 60 | 20 | 20 | 4.5 | 131 | 171 | 110 | 61 | 37.7 | 0.26 | 2.33 | G |

TABLE 3-continued

Foam Structures of Example 3

| Run No. | Polystyrene[1] (percent) | SBA[2] (percent) | PAMS[3] (percent) | Blowing Agent $CO_2$ (pph)[4] | Foaming Temp. (C°) | Pressure (bar) Mixer In | Pressure (bar) Die | Pressure Drop (bar) | Density (kgm) | Cell Size (mm) | Cross-Section (cm²) | Skin[5] |
|---|---|---|---|---|---|---|---|---|---|---|---|---|
| 8 | 60 | 20 | 20 | 4.5 | 131 | 143 | 90 | 53 | 34.0 | 0.21 | 2.35 | G |

*Control
[1]Polystyrene of weight molecular weight of 200,000 according to SEC
[2]Styrene-Butylacrylate copolymer (12 percent butyl acrylate by weight based on weight of the copolymer)
[3]Polyalphamethylstyrene
[4]pph = parts blowing agent per hundred parts of polymer by weight
[5]Skin quality (G = good; A = average; P = poor)

TABLE 4

Foam Structure of Example 4

| Run No. | Styrene Content (percent) | Acrylic Acid Content (percent) | Blowing Agent (pph)[1] $CO_2$ | Blowing Agent (pph)[1] $H_2O$ | Foaming Temp. (C°) | Pressure (bar) Mixer In | Pressure (bar) Die | Pressure Drop (bar) | Density (kgm) | Cell Size (mm) | Cross-Section (cm²) | Skin[2] |
|---|---|---|---|---|---|---|---|---|---|---|---|---|
| 9* | 100 | 0 | 4.0 | 0.3 | 134 | 207 | 121 | 86 | 38.2 | 0.21 | 2.34 | G |
| 10 | 97 | 3 | 4.0 | 0.3 | 137 | 190 | 112 | 77 | 38.1 | 0.25 | 2.89 | G |

*Control
[1]pph = parts blowing agent per hundred parts of polymer by weight
[2]Skin quality (G = good; A = average; P = poor)

TABLE 5

Foam Structures of Example 5

| | Unit | Run #11* | Run #12 | Run #13 | Run #14 | Run #15 | Run #16 |
|---|---|---|---|---|---|---|---|
| Polystyrene | percent | 100 | 0 | 0 | 0 | 50 | 75 |
| SBA-4 percent | percent | 0 | 100 | 100 | 100 | 0 | 0 |
| SBA-13 percent | percent | 0 | 0 | 0 | 0 | 50 | 25 |
| $CO_2$ | pph | 4.4 | 4.4 | 5 | 6 | 5 | 5 |
| Additives[1] | pph | 0.47 | 0.57 | 0.57 | 0.57 | 0.57 | 0.57 |
| Mixer Pressure | bar | 273 | 243 | 217 | 187 | 233 | 257 |
| Die Pressure | bar | 84 | 85 | 85 | 94 | 83 | 82 |
| Pressure Drop | bar | 189 | 85 | 132 | 93 | 150 | 175 |
| Foaming Temp. | (C°) | 128 | 125 | 125 | 125 | 118 | 125 |
| Density | kgm | 48.7 | 42.3 | 39.2 | 36.5 | 45.9 | 46.1 |
| Cell Size | mm | 0.43 | 0.43 | 0.45 | 0.18 | 0.42 | 0.45 |
| Thickness | mm | 45 | 32 | 35 | 20 | 37 | 35 |
| Width | mm | 110 | 150 | 145 | 130 | 135 | 146 |
| Cross-Section | mm² | 4950 | 4800 | 5075 | 2600 | 4995 | 5110 |
| Skin Quality[2] | | Poor | Exc | Good | Poor | Good | Good |
| Comp. Strength V[3] | kpa | 455 | 357 | 346 | 241 | 388 | 376 |
| Comp. Strength E[3] | kPa | 369 | 375 | 251 | 191 | 368 | 400 |
| Comp. Strength H[3] | kPa | 318 | 276 | 253 | 172 | 332 | 326 |
| Comp. Strength Total[3] | kPa | 1142 | 1008 | 850 | 604 | 1088 | 1102 |
| E.D.C. V (30d)[4] | percent | −0.2 | −0.1 | −0.2 | −0.6 | −0.3 | −0.2 |
| E.D.C. E (30d)[4] | percent | −0.1 | 0.1 | 0.5 | −0.4 | −0.1 | 0 |
| E.D.C. H (30d)[4] | percent | −0.1 | −0.3 | −0.4 | −1.5 | −0.7 | −0.4 |
| W.V.P.[5] | ng/Pasm | 1.83 | 1.41 | 1.68 | 2.5 | 1.31 | 1.37 |

*Control foam structures
[1]Additives were Barium Stearate (BaSt), dye concentrate, polyethylene, and talc
[2]Skin quality (Exc = excellent)
[3]Compressive strength in vertical, extrusion, and heighth directions, and in total (kilopascals (kPa))
[4]Percent environmintal dimensional change in horizontal, extrusion, and heighth directions at age of 30 days
[5]Water vapor permeability

TABLE 6

Foam Structures of Example 6

| | Unit | Run #17* | Run #18 | Run #19 | Run #20 |
|---|---|---|---|---|---|
| Polystyrene | percent | 100 | 0 | 0 | 0 |
| SBA-4 percent | percent | 0 | 100 | 100 | 80 |
| $CO_2$ | pph | 4.4 | 4.4 | 4.4 | 4.4 |
| EtOH | pph | 1 | 1 | 2 | 1 |
| Additives[1] | pph | 0.57 | 0.57 | 0.57 | 0.57 |
| Mixer Pressure | bar | 244 | 174 | 164 | 141 |
| Die Pressure | bar | 85 | 84 | 84 | 78 |
| Pressure Drop | bar | 159 | 90 | 80 | 63 |
| Foaming Temp. | (C°) | 128 | 122 | 122 | 122 |
| Density | kgm | 45.8 | 37.4 | 33.4 | 33.5 |
| Cell Size | mm | 0.47 | 0.38 | 0.39 | 0.35 |
| Thickness | mm | 37 | 34 | 32 | 32 |
| Width | mm | 135 | 145 | 135 | 125 |
| Cross-Section | mm² | 4995 | 4930 | 4320 | 4000 |
| Skin Quality[2] | | Good | Exc | Exc | Exc |
| Comp. Strength V[3] | kPa | 430 | 450 | 393 | 341 |
| Comp. Strength E[3] | kPa | 408 | 187 | 167 | 213 |
| Comp. Strength H[3] | kPa | 339 | 227 | 185 | 177 |
| Comp. Strength Total[3] | kPa | 1177 | 864 | 745 | 731 |
| E.D.C. V (30d)[4] | percent | −0.1 | −0.2 | −0.1 | 0.1 |
| E.D.C. E (30d)[4] | percent | 0 | 0.8 | 1.4 | 0.8 |
| E.D.C. H (30d)[4] | percent | −0.2 | −0.4 | −0.3 | −0.3 |

TABLE 6-continued

| | | Foam Structures of Example 6 | | | |
|---|---|---|---|---|---|
| | Unit | Run #17* | Run #18 | Run #19 | Run #20 |
| W.V.P.[5] | ng/Pasm | 1.14 | 2.09 | 2.22 | 1.55 |

*Control foam structures
[1-5]Same as in Table 5

TABLE 7

| | | Foam Structures of Example 7 | | | | | |
|---|---|---|---|---|---|---|---|
| | Unit | Run #21 | Run #22 | Run #23 | Run #24* | Run #25* | Run #26* |
| ButylAcrylate content | percent | 3 | 3 | 3 | 0 | 0 | 0 |
| Thickness | mm | 50 | 50 | 90 | 50 | 50 | 90 |
| $CO_2$ | pph | 4.7 | 4.9 | 4.4 | 4.0 | 4.0 | 4.0 |
| EtOH | pph | 1.0 | 0.0 | 0.0 | 1.5 | 0.0 | 0.0 |
| Iso-pentane | pph | 0.0 | 2.0 | 1.5 | 0.0 | 2.1 | 2.0 |
| Additives[1] | pph | 3.15 | 3.15 | 3.35 | 3.15 | 3.4 | 3.4 |
| Foaming temperature | °C. | 117 | 112.5 | 110 | 117 | 116 | 109 |
| Mixer pressure | bar | 161 | 125 | 154 | 154 | 142 | 143 |
| Die pressure | bar | 82 | 78 | 78 | 78 | 84 | 71 |
| Pressure drop | bar | 80 | 46 | 76 | 77 | 58 | 71 |
| Density | kg/m³ | 36 | 33.8 | 35.6 | 40.1 | 38.2 | 39 |
| Cell size | mm | 0.35 | 0.22 | 0.34 | 0.41 | 0.25 | 0.31 |
| Compressive strength V[2] | kPa | 247 | 357 | 462 | 300 | 412 | 439 |
| Compressive strength E[2] | kPa | 230 | 225 | 173 | 245 | 245 | 192 |
| Compressive strength H[2] | kPa | 117 | 138 | 172 | 183 | 188 | 209 |
| Total compressive strength[2] | kPa | 594 | 720 | 807 | 728 | 845 | 840 |

*Control foam structures
[1]Additives were hexabromocyclododecane (HBCD), BaSt, tetrasodium pyrophosphate (TSPP), and polyethylene
[2]Compressive strength in vertical, extrusion, and heighth directions, and in total (kilopascals (kPa))

What is claimed is:

1. The process for making a closed-cell styrenic polymer foam structure, comprising:
   a) heating a styrenic polymer material comprising greater than 50 percent by weight styrenic monomeric units and about 0.1 to about 40 percent by weight of oxygen-containing monomeric units based upon the total weight of the styrenic polymer material, the oxygen-containing monomeric units being selected from the group consisting of $C_{1-8}$ alkyl ester, $C_{1-8}$ alkyl anhydride, and $C_{1-8}$ aliphatic alcohol monomeric units to form a melt polymer material;
   b) incorporating into the melt polymer material at an elevated pressure a blowing agent comprising about 5 weight percent or more of carbon dioxide based upon the total weight of the blowing agent to form a foamable gel;
   c) expanding the foamable gel at a reduced pressure to form a foam structure.

2. The process of claim 1, wherein the blowing agent comprises about 10 percent or more carbon dioxide by weight based upon the total weight of the blowing agent.

3. The process of claim 1, wherein the blowing agent comprises about 20 percent or more carbon dioxide by weight based upon the total weight of the blowing agent.

4. The process of claim 1, wherein the foamable gel is cooled to an optimum foaming temperature, and then expanded by extruding it through the die to form the foam structure.

5. The process of claim 1, wherein the oxygen-containing monomeric units comprise $C_{1-8}$ alkyl ester monomeric units.

6. The process of claim 4 wherein a nucleating agent is incorporated into the melt polymer material.

7. The process of claim 5, wherein the styrenic polymer material further comprises polystyrene.

8. The process of claim 1, wherein the oxygen-containing monomeric units comprise $C_{1-8}$ alkyl anhydride monomeric units.

9. The process of claim 1, wherein the styrenic polymer material has greater than 70 percent by weight styrenic monomeric units based upon the total weight of the styrenic polymer material.

10. The process of claim 1, wherein the blowing agent is incorporated into the melt polymer material at a concentration of from about 2 to about 18 parts by weight per hundred parts of melt polymer material.

11. The process of claim 1, wherein the blowing agent is incorporated into the melt polymer material at a concentration of from about 1 to about 30 parts by weight per hundred parts of melt polymer material.

12. The process of claim 1, wherein the blowing agent further comprises a secondary blowing agent comprising a $C_{1-6}$ aliphatic alcohol.

13. The process of claim 12, wherein the $C_{1-6}$ aliphatic alcohol is ethanol.

14. The process of claim 1, wherein the blowing agent further comprises a secondary blowing agent comprising a $C_{1-9}$ aliphatic hydrocarbon.

15. The process of claim 1, wherein the blowing agent consists essentially of carbon dioxide.

16. The process of claim 4, wherein the blowing agent consists essentially of carbon dioxide.

17. The process of claim 16, wherein the styrenic polymer material further comprises polystyrene.

18. The process of claim 16, wherein the styrenic polymer material comprises styrene/butyl acrylate copolymer.

19. The process of claim 16, wherein the styrenic polymer material comprises styrene/butylmethacrylate copolymer.

* * * * *